United States Patent Office 2,973,336
Patented Feb. 28, 1961

2,973,336
FRICTION ELEMENT CONTAINING CUPRIC OXIDE AND RESIN BINDER

René Paul Delaplace, 29 Rue Ouled Ziane, and Marcel Antoine Gustave Koehler, 38 Rue Gallieni, both of Casablanca, Morocco No Drawing. Filed Jan. 21, 1958, Ser. No. 710,172

Claims priority, application Morocco Dec. 2, 1953

7 Claims. (Cl. 260—38)

This application is a continuation-in-part of application Serial No. 471,125, filed November 24, 1954.

The present invention pertains to friction elements, and more particularly to friction elements having coefficients of friction stabilized at high values even at high temperatures.

Friction elements in use today, especially those adapted for heavy duty use, such as clutch facings and brake linings employed in high speed aircraft or in high horsepower automobiles and trucks, suffer from many disadvantages. The most detrimental factor is that the heretofore known friction elements do not have a stable coefficient of friction. As a consequence of this, brakes may tend to grab, operate irregularly, or fail entirely. This is particularly true after the brakes have been in use for a prolonged period. Also clutches have the tendency to slip rather than to operate smoothly. A further disadvantage of the heretofore known friction elements is that these elements have low or irregular or diminishing coefficients of friction when used in high temperature applications and hence they are unsuitable for these purposes. Furthermore, the present day friction elements do not have a sufficiently high coefficient of friction which is required for use in high speed applications, such as in airplane brakes, particularly those used for jet aircraft.

Accordingly, it is an object of the present invention to provide friction elements which will have high coefficients of friction. It is a further object to provide friction elements which will have stabilized coefficients of friction. An additional object of the invention is to provide friction elements which have stabilized coefficients of friction even at high temperatures.

The above objects are accomplished in accordance with the present invention by incorporating a special material into friction elements which will impart to the friction elements coefficients of friction stabilized at high values even at high temperatures. The friction elements of the invention contain the conventional components of a friction element, such as a fibrous material, e.g., asbestos fibers; binders, for example, heat hardenable organic binders such as phenol formaldehyde resins or modified phenol formaldehyde resins; and filler materials, such as clay, metals, and metallic oxides. In addition to these conventional components of a friction element, the friction elements of the invention contain anhydrous cupric oxide. The anhydrous cupric oxide is employed therein in an amount from about 6% to about 80%, and preferably in an amount of about 55%, of the weight of the friction elements. In order to achieve the desired qualities of the friction elements of the invention it may be desirable in some instances to insure that the anhydrous cupric oxide be concentrated at the surface of the friction elements. This concentration of the anhydrous cupric oxide at the working surfaces of the friction elements provides a shiny, smooth, black film thereon. However, in most cases the anhydrous cupric oxide is uniformly distributed throughout the friction elements.

In view of the above, it will be appreciated that the invention pertains to the addition of anhydrous cupric oxide to conventional friction elements and that the nature of the various other components in the friction elements does not form a part of the present invention.

It has also been found that the desirable qualities imparted to friction elements by incorporation therein of anhydrous cupric oxide may be further improved by incorporating into the friction elements various other components in addition to the conventional components. In these improved embodiments of the invention from about 6% to about 80%, and preferably about 55%, of anhydrous cupric oxide is once again employed. In these embodiments, however, the anhydrous cupric oxide is present in the friction elements in the form of a component of a mixture of from about 25% to about 75% of anhydrous cupric oxide and from about 75% to about 25%, respectively, of one or more of the following materials: zinc, iron, lead, nickel, cobalt, molybdenum, tungsten, oxides of these metals, calcined alumina and forms of elemental carbon, such as carbon black and graphite.

The friction elements of the invention may be fabricated in the conventional manner for the manufacture of friction elements with the reservation that the anhydrous cupric oxide in certain instances should be concentrated therein at the surface of the friction elements. This can be readily achieved during the compounding step and prior to the molding operation.

The friction elements of the invention will be further illustrated by the following examples which are typical of the friction elements of the invention.

Example I

A brake lining for automobile and truck brakes was fabricated of the following materials.

| Components: | Percent by weight |
|---|---|
| Anhydrous cupric oxide | 12 |
| Copper (300 mesh) | 3 |
| Zinc (300 mesh) | 5 |
| Phenol formaldehyde resin | 20 |
| Asbestos fibers | 60 |
| Total | 100 |

When this lining was tested in automobile and truck brakes, it was found to have a coefficient of friction of 0.6 which remained stable for a prolonged period.

Example II

A brake lining for a jet aircraft was fabricated from the following materials:

| Components: | Percent by weight |
|---|---|
| Anhydrous cupric oxide | 45 |
| Copper | 5 |
| Cashewnut modified phenol formaldehyde resin | 27 |
| Asbestos fibers | 23 |
| Total | 100 |

This brake lining had a coefficient of friction of 0.30 at 600° C. when subjected to a peripheral speed of 30 meters per second and a pressure of 30 kilograms per square centimeter. This coefficient of friction remained constant under these rigorous conditions during 50 successive trials.

From the data presented above, it is clear that the invention has provided for the first time friction elements which have high coefficients of friction that are stabilized at high values even at high temperatures.

When the friction elements heretofore known are used, for example, as linings for brakes of high speed automobiles or aircraft, they are subjected to very high temperatures at the working surfaces thereof. These high temperatures cause chemical cracking or decomposition of the hydrocarbon binder in the friction elements with the production of gases, tars, and oils as by-products formed at the working surfaces. These tars and oils at the working surfaces of the brake linings cause the brakes to fade. The presence of anhydrous cupric oxide in the conventional friction elements, however, eliminates this fading, since the anhydrous cupric oxide acts as an oxidant to decompose these tar and oil by-products and convert them to gases which are readily dissipated from the lining.

Since various modifications and variations may be made in the invention herein set forth without departing from the spirit thereof, it will be appreciated that the invention is to be limited only within the scope of the appended claims.

We claim:

1. An article of manufacture consisting of a brake lining having a coefficient of friction stabilized at a high value even at high temperatures and formed of from about 6% to about 80% by weight of anhydrous cupric oxide based on the weight of the brake lining, the balance of said brake lining being substantially thermosetting resin binder, asbestos fiber and inorganic filler material.

2. An article of manufacture consisting of a brake lining having a coefficient of friction stabilized at a high value even at high temperatures and formed of about 55% by weight of anhydrous cupric oxide based on the weight of the brake lining concentrated at the working surface of the brake lining, the balance of said brake lining being substantially thermosetting resin binder, asbestos fiber, and inorganic filler material.

3. An article of manufacture consisting of a brake lining having a coefficient of friction stabilized at a high value even at high temperatures and formed of from about 6% to about 80% by weight of anhydrous cupric oxide based on the weight of the brake lining, said anhydrous cupric oxide being present therein as a component of a mixture consisting essentially of from about 25% to about 75% by weight of the mixture of anhydrous cupric oxide and from about 75% to about 25% by weight of the mixture respectively of at least one member selected from the group consisting of zinc, iron, lead, nickel, cobalt, molybdenum, tungsten, their oxides, carbon black, graphite, and calcined alumina; the balance of said brake lining being substantially thermosetting resin binder, asbestos fiber, and inorganic filler material.

4. An article of manufacture consisting of a brake lining having a coefficient of friction stabilized at a high value even at high temperatures and formed of about 12% of anhydrous cupric oxide, about 3% of copper, about 5% of zinc, about 20% of thermosetting resin binder, and about 60% of asbestos fibers; said amounts being percent by weight of the brake lining.

5. A brake lining as set forth in claim 4 wherein the thermosetting resin binder is a phenol formaldehyde resin.

6. An article of manufacture consisting of a brake lining having a coefficient of friction stabilized at a high value even at high temperatures and formed of about 45% of anhydrous cupric oxide, about 5% of copper, about 27% of thermosetting resin binder, and about 23% of asbestos fibers; said amounts being percent by weight of the brake lining.

7. A brake lining as set forth in claim 6 wherein the thermosetting resin binder is a cashew-nut-modified phenol formaldehyde resin.

References Cited in the file of this patent

UNITED STATES PATENTS

| | | |
|---|---|---|
| 1,919,730 | Koenig et al. | July 25, 1933 |
| 2,286,744 | Leatherman | June 16, 1942 |
| 2,326,000 | Teeple | Aug. 3, 1943 |
| 2,534,607 | Laher et al. | Dec. 19, 1950 |
| 2,686,140 | De Gaugue | Aug. 10, 1954 |

OTHER REFERENCES

Webster's New International Dictionary, 2nd edition, page 588.